Patented July 16, 1946

2,404,268

UNITED STATES PATENT OFFICE 2,404,268

METHACRYLIC ESTERS AND COPOLYMERS THEREOF

Carl E. Barnes, Belvidere, N. J., assignor to Polaroid Corporation, Cambridge, Mass., a corporation of Delaware No Drawing. Application January 10, 1944, Serial No. 517,701

5 Claims. (Cl. 260—83)

This invention relates to new and improved synthetic resins and, more particularly, to polymerizable methacrylic esters of cyclohexyl cyclohexanols.

The present application is a continuation-in-part of my copending application, Serial No. 431,734, filed February 20, 1942, for Methacrylic esters and copolymers thereof.

An object of the invention is to provide resins which are polymers of compounds of the character described and which are useful in the formation of hard, transparent, optical elements possessing relatively high indices of refraction.

Further objects of the invention are to provide polymers of compounds of the character described and to provide copolymers of compounds of the character described with polymerizable compounds from the class consisting of the unsaturated methylene compounds and, more specifically, to provide copolymers of compounds of the character described with other polymerizable methacrylates.

Other objects of the invention will in part be obvious and will in part appear hereinafter.

There is a pressing demand for a synthetic resin composition which may be used in the formation of optical elements such for example as lenses, prisms and the like and which may preferably be cast or molded to the desired form. A preferred resin is one which may be cast into the desired form by, for example, polymerizing the monomer in a suitable mold or by advancing the polymerization of the partially polymerized material in a suitable mold. This invention contemplates the provision of new synthetic resins or plastics which are particularly useful in the production of products of the character described. More specifically, this invention contemplates the provision of synthetic resins which, when polymerized, give transparent, hard, colorless products having relatively high indices of refraction and which are suitable for use in the production of optical elements of the character described.

The compositions of the present invention comprise compounds from the class consisting of the methacrylic esters of the cyclohexyl cyclohexanols, i. e., 1-cyclohexylcyclohexyl methacrylate, 2-cyclohexylcyclohexyl methacrylate, 3-cyclohexylcyclohexyl methacrylate, and 4-cyclohexylcyclohexyl methacrylate, and to copolymers thereof with other compounds from the class consisting of the polmerizable unsaturated methylene compounds.

The following preparation of 2-cyclohexylcyclohexyl methacrylate is given as illustrative of a method by which all of the methacrylic esters of the cyclohexyl cyclohexanols may be prepared: 182 grams (1 mol) of 2-cyclohexyl cyclohexanol are mixed in a suitable flask with 154 grams (1 mol) of methacrylic anhydride and 79 grams (1 mol) of pyridine. A small amount of copper cloth is added to the mixture as an inhibitor of polymerization. The mixture is then permitted to stand at a temperature of approximately 60 degrees C. for several hours and is diluted with ether and extracted several times with dilute sulphuric acid. It is then washed several times with dilute sodium hydroxide and finally with water. The ether layer is then concentrated and distilled under reduced pressure, 2-cyclohexylcyclohexyl methacrylate being distilled off.

Monomeric 2-cyclohexylcyclohexyl methacrylate is a liquid with a boiling point of approximately 179–182 degrees C. at 10 mm. pressure, or approximately 278 degrees C. at 760 mm. pressure. The monomer has a density of .9769 and an index of refraction of 1.49. It is clear and colorless.

The monomeric 2-cyclohexylcyclohexyl methacrylate, as well as the monomers of the other esters of the invention, may be readily polymerized by means of heat and/or actinic light, and/or chemical catalysis. A preferred catalyst is benzoyl peroxide, although other catalysts known in the art, as for example the organic peroxides and ozonides, may be employed. The polymerization may be effected in the presence or absence of a solvent for both monomer and polymer, or in the presence of a solvent for the monomer and a non-solvent for the polymer, or the monomer may be emulsified and then polymerized. Where accurately surfaced and shaped elements such as optical elements are being formed, it is preferable to first obtain a partial polymer of the ester and to complete the polymerization of the partial polymer in a suitable mold.

One example of a specific method whereby the monomeric 2-cyclohexylcyclohexyl methacrylate which is the product of the above esterification may be polymerized is by heating, for example in a test tube at a temperature of approximately 65° C. for approximately twenty-four hours in the presence of roughly .5% by weight of benzoyl peroxide, and thereafter heating at a temperature of approximately 120° C. for another twenty-four hours. This polymerization method will insure substantially complete polymerization of the monomer.

If it is desired to speed up the polymerization, greater quantities of benzoyl peroxide may be added or the polymerization may be effected at higher temperatures.

Polymeric 2-cyclohexylcyclohexyl methacrylate has a density of 1.0746. It has an index of refraction of 1.5219 and a reciprocal dispersion of 55. It is colorless, transparent, brittle and fairly hard, with a softening point of about 80 degrees C.

It will be noted that the refractive index of the polymer of 2-cyclohexylcyclohexyl methacrylate is above 1.5, which is a preferred condition. The polymer is, however, somewhat brittle, and where it is to be employed under conditions such that it may be subjected to shock, it may be desirable to copolymerize it with polymerizable compounds whose polymers are somewhat tougher. This is especially true where the high refractive index is not required. Copolymers having indices of refraction for the sodium line, for example greater than 1.5, and being substantially tougher than the pure polymers of any the above-described compounds, may be readily obtained by copolymerization of the monomers of the above compounds with such of the following polymerizable compounds known to produce tough polymers and whose indices of refraction are not excessively low. In this connection it should be noted that the cyclohexylcyclohexyl methacrylates may satisfactorily be copolymerized with virtually all the polymerizable unsaturated methylene compounds to produce products having diverse and varied physical and optical properties. Suitable compounds for use in forming copolymers of the type described with cyclohexylcyclohexyl methacrylates are methyl methacrylate, ethyl methacrylate, isopropyl methacrylate, ter-butyl methacrylate, cyclohexyl methacrylate and other esters of alpha-methacrylic acid; the vinyl esters such as vinyl formate, vinyl acetate, vinyl propionate and the vinyl ester of chloracetic acid, etc.; the vinyl ketones such as methyl vinyl ketone; styrene; and furylethylene (vinyl furan). Other suitable materials for use in the formation of copolymers falling within the scope of this invention are the esters of itaconic acid, the esters of acrylic acid, the esters of methylene malonic acid, and conjugated dienes such as 1,3-butadiene, 2-methyl-1,3-butadiene, and 2-cloro-1,3-butadiene.

One example of a satisfactory copolymer useful for optical purposes is the polymerization product of a mixture of the monomers of methyl methacrylate and 2-cyclohexylcyclohexyl methacrylate, the methyl methacrylate monomer constituting 5% by weight of the mixture. The polymerization may be effected by following the above-described procedure for effecting polymerization of the monomeric 2-cyclohexylcyclohexyl methacrylate.

It is to be understood that the list of substances given is not all inclusive although it is believed that the materials mentioned constitute the preferred substances for use in the present invention.

It is also be understood that, if desired, hardening agents may be employed in small or substantial percentages. Any of a vast number of suitable hardening agents may be used. A preferred hardening agent for use with copolymers comprising methyl methacrylate is either methacrylic acid or acrylic acid, although other known hardening agents such as methacrylic anhydride or allyl methacrylate may be used successfully.

While a preferred product is one which is transparent and which may be molded during polymerization into a suitable optical element, it is to be understood that products which are translucent or even opaque and hence useless in the formation of optical elements may be satisfactorily employed for other purposes where particularly hard, readily molded, polymerized plastics are desirable, and such products comprising the cyclohexylcyclohexyl methacrylates or a copolymer thereof with a polymerizable unsaturated methylene compound are to be deemed to fall within the scope of this invention.

As heretofore described, polymerization of the products of this invention may be accomplished preferably by heating mixtures of monomers or the slightly polymerized materials at relatively low temperatures for a predetermined period, and then carrying the polymerization forward to a desired point at substantially increased temperatures. For best results, it is preferable that the first stage of polymerization, i. e., at the lower temperature, be carried out until a hard product is obtained. Higher temperatures of polymerization generally increase the brittleness of the product.

It is, of course, to be understood that where molded optical elements are to be produced, the surfaces of the mold should be optically smooth as the molded product will have substantially the surface properties of the mold.

Since certain changes may be made in the above article and different embodiments of the invention could be made without departing from its scope, it is intended that all matter contained in the above description shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. As a new composition, a cyclohexylcyclohexyl methacrylate.

2. As a new composition, 2-cyclohexylcyclohexyl methacrylate.

3. A transparent resin comprising a polymer of a cyclohexylcyclohexyl methacrylate.

4. A transparent resin comprising a polymer of 2-cyclohexylcyclohexyl methacrylate.

5. Polymerized 2-cyclohexylcyclohexyl methacrylate having a density of 1.0746 and in index of refraction for the sodium line of approximately 1.5219.

CARL E. BARNES.